July 7, 1959 W. BACH ET AL 2,893,123
CINETHEODOLITES
Filed April 21, 1955 4 Sheets-Sheet 2
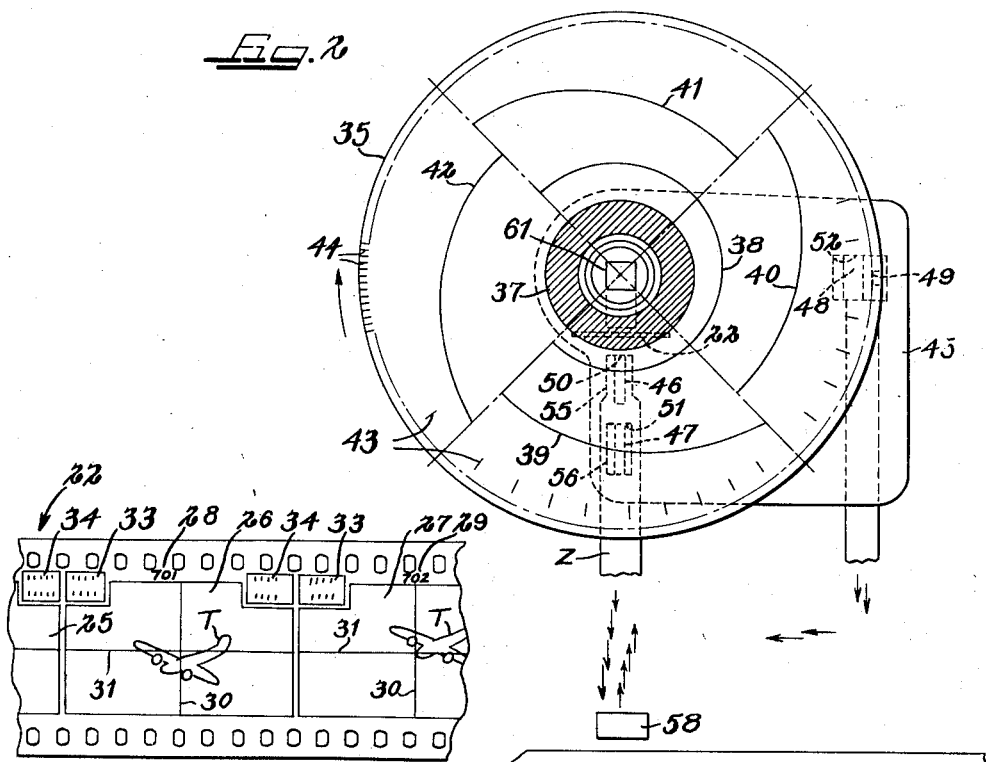
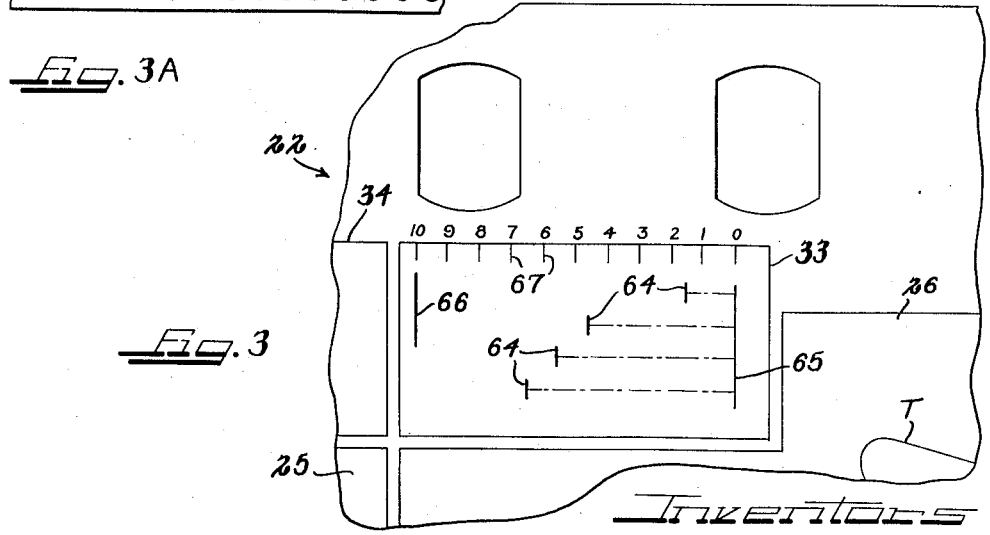
INVENTORS
WILLI BACH
ERNST BRACKERTZ
F. D. Prager
Atty.

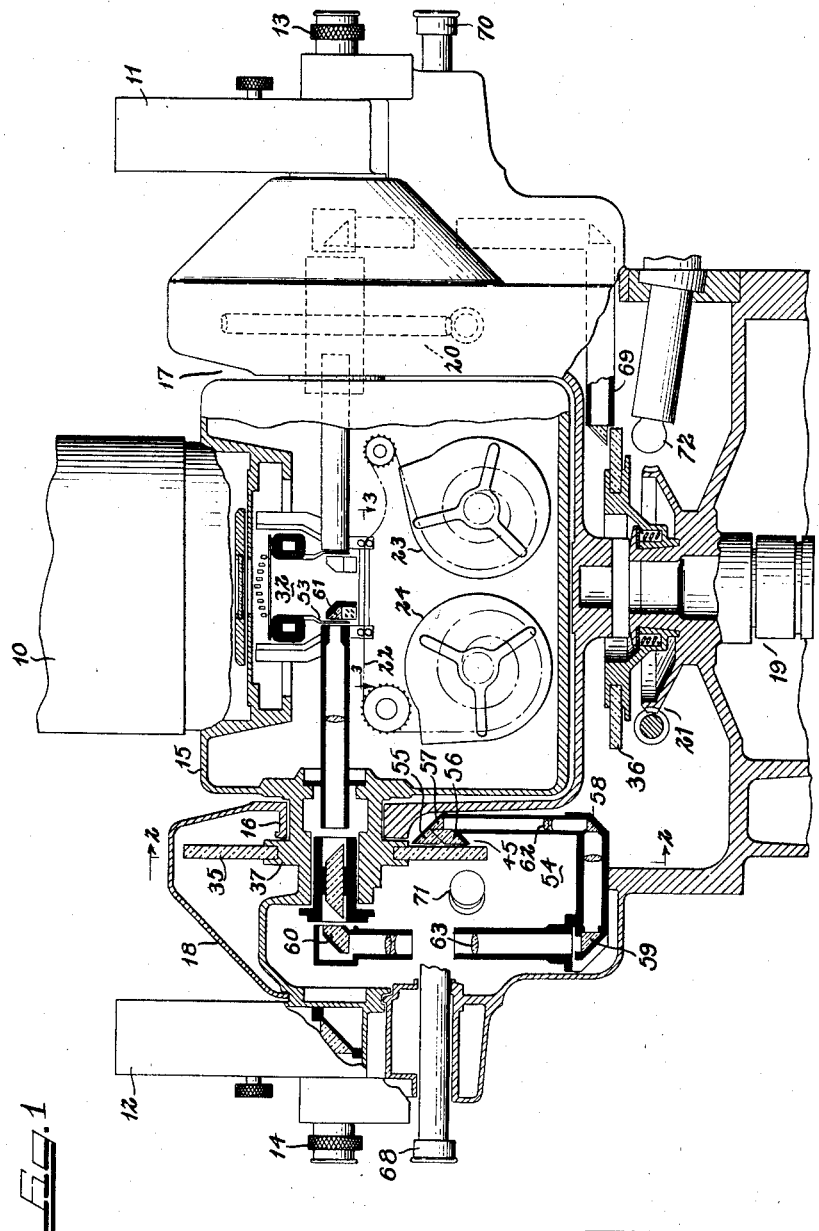

July 7, 1959  W. BACH ET AL  2,893,123
CINETHEODOLITES

Filed April 21, 1955  4 Sheets-Sheet 3

INVENTORS
WILLI BACH
ERNST BRACKERTZ
F. D. Prager
Atty.

July 7, 1959 W. BACH ET AL 2,893,123
CINETHEODOLITES
Filed April 21, 1955 4 Sheets-Sheet 4
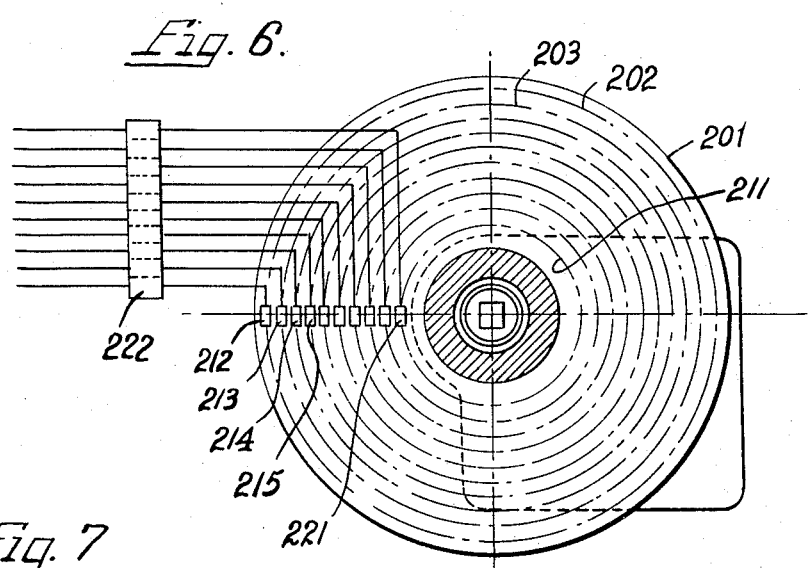
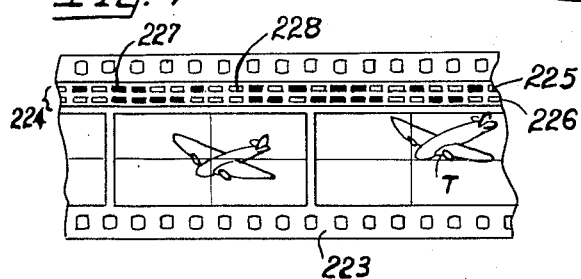
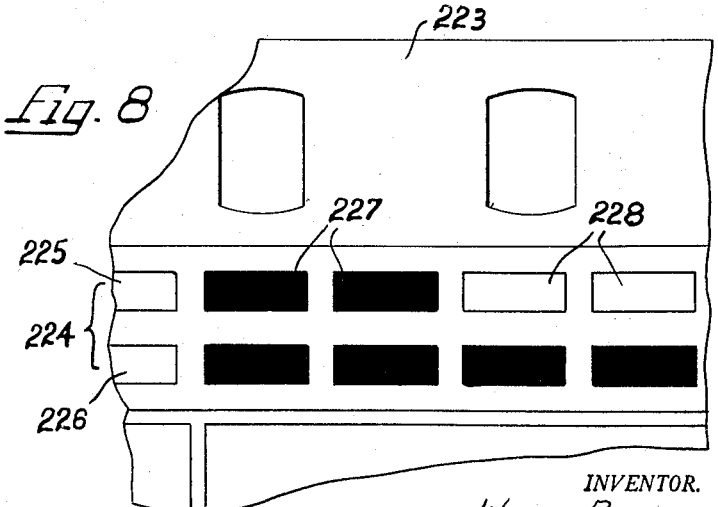
INVENTOR.
WILLI BACH.
BY ERNST BRACKERTZ
F. D. Prager
Atty.

United States Patent Office
2,893,123
Patented July 7, 1959

2,893,123

CINETHEODOLITES

Willi Bach, Berlin-Wilmersdorf, and Ernst Brackertz, Berlin-Steglitz, Germany, assignors to Askania-Werke A.G., Berlin-Friedenau, Germany, a corporation of Germany Application April 21, 1955, Serial No. 502,911

Claims priority, application Germany April 30, 1954

7 Claims. (Cl. 33—46)

This invention relates to cinetheodolites improved with respect to the manner and speed of target position measurement.

Heretofore, cinetheodolites furnished target position measurements, coordinated with the target images, which could be utilized only by means of intervening human agency and only at a correspondingly low speed. These measurements usually comprised, or consisted in, numbered scale graduations, either of the basic radial or parallel types or sometimes combined with more special signs but always in need of human reading of scale or grid numbering marks. The resulting slowness of cinetheodolite record interpretation has been regretted and a need for faster interpretation has been felt but so far as we know the need has not been supplied up to now.

A main object and feature of our invention is that a cinetheodolite has been provided which allows automatic and accelerated measurement and interpretation of target position data, coordinated with the target images. Other objects are, so to provide without adding seriously to the complexity of the instrument; to insure high precision; and to provide for a wide range of data utilizations. Still other objects may appear from our specific disclosure, which follows.

The objects have been achieved largely by means of novel cinetheodolite position markers, with the aid of corresponding transmitting and recording systems. The new markers have elements which can be measured and/or counted automatically, in suitable groups or position arrangements for the angular values to be measured.

The details will best be explained in connection with the description of preferred embodiments which follows.

In the drawing:

Figure 1 is an elevation, partly in central vertical section, of an instrument incorporating the present invention.

Figure 2 shows a detail, seen in the plane of the lines 2—2 in Figure 1.

Figure 3 is an enlarged fragmentary view of a cinetheodolite record according to this invention.

Figure 3A is a more complete view, substantially in actual size, of such a record.

Figure 4:
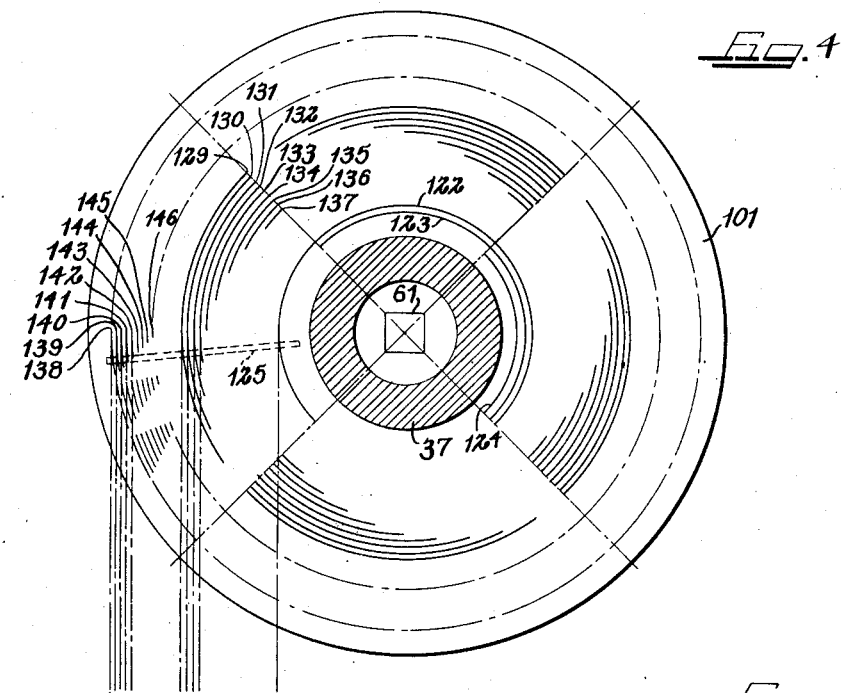
Figure 4 shows a modified detail in a view generally similar to that of Figure 2.

Referring first to Figure 1:

The cinetheodolite has a main telescope 10 and a pair of target-finder telescopes 11, 12 with oculars 13, 14. The three telescopes are rigidly combined into a unit with parallel telescope axes by a telescope frame 15. This telescope frame is swingable in a pair of bearing members 16, 17 having a horizontal axis and forming parts of a support frame 18. The support frame 18 is swingable about a bearing member 19 having a vertical axis. Adjustment gear drives 20, 21 are provided for swinging the telescope frame about the horizontal axis and the support frame about the vertical axis. These drives have actuators, for instance hand wheels and associated rough and fine actuation selectors, not shown, whereby for instance the observers using the target-finder telescopes 11, 12 may control the drives 20, 21 respectively. In this manner the main telescope 10 can keep track of the moving target, subject to relatively minor, measurable translation of the target across the field of view of the main telescope.

Referring to Figures 3 and 3A:

A record of the target is produced on a photographic film 22 within the telescope frame 15. The film moves through the field of view of the main telescope, from a supply reel 23 to a receiving wheel 24 actuated by a suitable camera motor not shown. The record comprises a succession of frames 25, 26, 27, produced by exposing successive areas of the film emulsion. These successive areas may be identified by numbers 28, 29 printed on the film. Each area may also have a system of hairline coordinates 30, 31 printed or otherwise preformed thereon to determine a zero point or center point for measuring translation of the target across the field of view.

A suitable shutter mechanism 32 is provided for the exposure of successive areas of the film. This mechanism is interposed between the main telescope 10 and the film. Similar mechanisms of other cinetheodolites, trained on the same target, can be kept synchronized with the mechanism 32 by suitable control means not shown.

The film 22 serves to record, in addition to the picture of the target T, the successive positions of the target in space, that is, the successive angular directions of the telescope axes relative to the horizon and to the major vertical circle of a point other than the target. For this purpose a pair of subframes 33, 34 are shown for each principal frame 25, 26, 27. These subframes 33 form insets of the principal frames in their upper lefthand corners, for recording positions in vertical planes; and the subframes 34 form similar insets in the upper righthand corners for recording azimuth values.

Heretofore a cinetheodolite position record consisted in a series of subframes which showed portions of graduated and numbered scales. The scales so shown had basically the forms of dials of timekeepers or angular protractors: circles with short radial graduations. Suitable graduations, for instance every fifth or tenth graduation, were usually marked by corresponding numbers. It was due to the original incorporation of this age old dial type of measurement in the cinetheodolite that readings could be achieved only by human agency and only somewhat slowly; there being no practical device, suitable for use within a complicated instrument such as a cinetheodolite, to automatically or rapidly read this former type of measurement. This has caused considerable inconvenience. Numbers of frame exposures are made every second, with two subframes for position data, and with the understanding that two or three cinetheodolite records for any one moving target must be combined for full determination of the target position in space.

According to the invention as illustrated in Figures 1 to 3 each subframe of the position record shows an image, dissolving an angular position value into measurable units, particularly measurable distances. In the interest of accuracy the image dissolves the angular value into a number of distances, for different decades or positions of the value. This in turn is facilitated by using the so-called European or decimal degree system, dividing the circle into four hundred equal parts.

The measurable, dissolved position image is formed by a subcombination of measuring and transmitting means, illustrated in Figures 1 and 2. According to these figures a rigid part of the telescope and camera frame or "alidade" 15, swingable therewith about the horizontal axis of the bearings 16, 17, is formed by a vertical glass disc 35. The support frame 18 is swingable about its vertical axis and co-axially with a fixed horizontal glass disc 36. These discs are annular. They may have identical construction and markings. It will be sufficient to describe one of them, for instance the vertical disc 35.

The central edge portion of this disc is fastened to a central hollow axle or hub 37, co-axial with the corresponding bearing system. One of the flat surfaces of the disc is coated or otherwise treated to provide an opaque-transparent marker system thereon. Preferably transparent lines or slots are used, although the markings are shown black on white for convenience. They comprise an innermost spiral slot 38 which extends over three quadrants of the disc, with uniformly increasing radial distance from the axis of the disc as the slot extends away from a starting point located one quadrant away from a zero position Z of the disc. The markings of the disc comprise further on, in a zone between the center and the periphery, a system of four identical spiral slots 39, 40, 41, 42, each extending over one of the four quadrants which start with zero position and each having uniformly increasing radial distance in generally similar manner as described, although not necessarily with the same curvature as is used for the central slot 38. Still farther out on the disc there is provided a circular series of forty radial slot graduations 43 with uniform angular distance from one another, suitably correlated with the zero position Z. The outermost peripheral part of the disc has four hundred radial slot graduations 44 with uniform angular distances from one another again suitably correlated with the zero position Z.

The marked disc 35 is angularly movable relative to a reference system. The latter system is advantageously incorporated in a rigid support plate 45 adjacent and parallel to the opaque disc surface. This plate is perforated by a window for each of the four concentric systems of markings. It has an innermost narrow radially oriented window 46 transverse of the spiral slot 38 and covering the radial sweep of that slot. The plate as shown has an adjacent narrow window 47 similarly oriented and arranged for the four spiral slots 39, 40, 41, 42. The plate has another narrow window 48 tangentially oriented, transverse of the forty radial slots 43 and covering a certain length of such slots. Finally it has an outermost narrow and relatively short window 49 similarly covering one of the four hundred radial slots 44 in each position of the disc. The two pairs of windows 46, 47 and 48, 49 are advantageously arranged one quadrant apart from one another in order to facilitate the measurements and the transmission thereof as will be described. Each of the four windows is so arranged that normally just one, or part of one, of the radial or spiral markings is visible therein; and each has a straight terminal edge 50, 51, 52, etc. substantially parallel to the coordinated marking and thus providing a reference line for determining the distance between the exposed part of the mark and a reference point. In this manner the angular position of the disc 35 is reflected by a system of distances between markings 38, etc. and corresponding reference edges 50, etc. The windows 46, 47, 48, 49 serve respectively to show hundreds, tens, units and tenths of angular values marked at 44. It may be noted from Figure 2 that the disc as shown has been rotated somewhat more than one hundred forty decimal degrees from the zero point Z and it may be assumed that the exact rotation has been one hundred forty-five point six six degrees.

At the instant when the shutter mechanism 32 produces a record of the target T said mechanism also produces a correlated position record by opening a shutter 53 on a transmission system 54 for vertical circle values.

This transmission system comprises:

A pair of double prisms or parallel translating devices 55, 56 associated with each pair of windows 46, 47 and 48, 49, for combining the images of such windows into closely spaced, parallel light bundles; prisms 57, 58, 59, 60, etc. for passing these images toward and axially into the hollow hub 37; and a final prism 61 for directing these images onto the film 22 and particularly onto the space for subframes 33. The present transmission system also comprises a plurality of microscope and transmission lenses 62, 63, etc., so selected with reference to the values and radial positions of the markings that the several images have dimensions suitably proportioned to one another. In other words for instance the image of a unit transmitted by window 49 and associated prisms and lenses is made equal in linear length to the image of a decade transmitted by window 48 and associated prisms and lenses.

By virtue of this transmission system there appears in the subframe 33, at the instant of target exposure, a plurality of marks 64 in areas closely spaced above one another. Either three or four marks appear, depending on whether the disc 35 brings the blank portion of the mark 38 or any of the other three quadrants of said mark onto the corresponding window 46. The position of each reference edge 50, 51, etc. appears in the subframe 33 at one and the same vertical reference line 65; and there can also be an opposite reference or justifying line 66. The vertical position of the target coordinates, which according to the example given above is one hundred forty five point six six decimal degrees, is recorded in the subframe 33 in form of four linear distances, all measurable from the reference line 65 and reaching to the different marks 64. The uppermost mark 64 represents by its position the "one hundred plus" value of said angle of one hundred forty five point six six decimal degrees. The second highest mark 64 represents the corresponding "forty plus" value. The second lowest mark 64 represents the "five plus" value. The lowermost mark 64 represents the value "six point six tenths."

On completion of the record and position record, that is on development of the film 22, the aforesaid distances or marker positions can be measured automatically, and rapidly, by scanning the subframe with suitable sets of photoelectric or equivalent devices, not shown, as is known in the art of punch card selectors and the like. Such scanning can be arranged in known manner to avoid scanning responses to the above-mentioned "plus" or fractional parts of the second and third marker positions 64, whereas the device scanning the image appearing at the lowermost marker 64 is desirably made sensitive enough to react to the exact position of the mark. Only fractions of a millimeter are here involved but very accurate reading can be obtained with films of sufficient resolution and of course with instruments of sufficient mechanical and optical accuracy.

It is also possible to scan some other function of the position image than the completed record itself. For instance the film may be projected upon a screen and the projected image may be scanned.

Still further it is possible to read the position record visually instead of measuring it automatically. Heretofore as mentioned visual reading was the only possible utilization of the record whereas it now becomes merely an exceptional operation. For visual reading, numbered and preformed or printed graduations 67 are shown along the top edge of the subframe 33.

It is also possible to read the record visually without the film. For this purpose a retractable visual observation device 68 or the like may be interposed in the joint path of the measurement images transmitted from the windows 46, 47, 48, 49 to the horizontal axis. Likewise such a retractable device of course can be used for other purposes. For visual reading of the record, independently of the film, the retractable device 68 may be inserted, against the pressure of a spring, not shown, into the record-reading ray trace between the elements 63 and 60. In the so inserted region the device 68 may have an optical deflector such as an mirror or prism, not shown; and the device 68 may further include, between this deflector and the outside of the instrument, additional elements such as lenses, not shown. These elements together with those shown at 55, 56, 57, 62, 58, 59, 63 etc. may complete a microscope system, focussed on the disc to be read.

The azimuth of the target is similarly measured and transmitted to the subframe 34 by a system 69 which may have a retractable observation device 70.

The markings or slots of the opaque discs 35, 36 will generally be illuminated by suitable electrical light sources 71, 72, etc., opposite the various windows or groups of windows. Various other accessories of the instrument may be noted in the drawing which need not be described herein.

Figure 5:
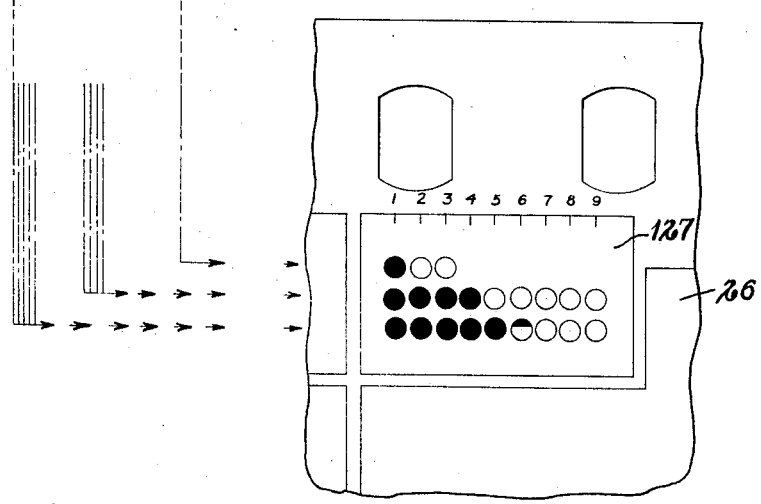
Figure 5 is an enlarged fragmentary view of a record taken with a device according to Figure 4.

Referring now to Figures 4 and 5:

It is possible to use a position disc 101 having transparent markings in form of circular, staggered, concentric arcs. In this case groups of unit arc portion images are produced in a series of nine small openings interposed between the disc and the film. A similar arrangement is used for the decade arc portions whereas only three small openings are required for the arc portions corresponding with the hundreds values. It is again assumed that four hundred degrees are used. Adjacent the hub 37 three concentric arcuate marking slots 122, 123 and 124 are provided. One of them 124, extends over one quadrant of one hundred degrees; a second, 123, extends over two quadrants or two hundred degrees, overlapping with the first and the third, 122, similarly extends over three quadrants or three hundred degrees. A radial master window plate 125 is provided, extending along a complete radius of the annular disc and thus traversing the area of the markers 122, 123, 124. It similarly traverses the area of corresponding markers 129, 130, 131, 132, 133, 134, 135, 136 and 137 representing the "tens" and a still further system of markers 138 to 146 corresponding with the units of angular values. The arcuate extensions of these markers correspond with their respective values to be represented.

Accordingly, the nine markers shown in the drawing with the identifying numbers 138 to 146 are repeated forty times on the disc 101, in uniformly spaced, peripherally aligned groups. Corresponding with the nine positions of markers of different length in each of these groups, up to nine small openings are formed by the superposition of the window of plate 125 on the disc; and likewise up to nine small openings are formed, corresponding to the decade markers, illustarted at 129 to 137 . In this manner which is not believed to require a detail representation in the drawing there can be produced in the subframe 127, three series of circles corresponding with the system of markers, these circles being exactly superposed above one another as shown in Figure 5. In the zero position of the disc 101 none of said small openings are exposed to light and no exposure occurs in any of the circular spaces in the subframe 127 upon the opening of the shutter. Upon rotation of the disc various combinations of openings are exposed to light and various corresponding combinations of circles in the subframe are photographically exposed upon the opening of the shutter. Of course numerous unused exposures of transmission openings occur during the rotation of the disc intermediate shutter openings.

It will be seen that each marker system, including either spiral lines as in Figure 2 or complete or broken circular lines as in Figure 4, constitutes in essence a system of record elements comprising a plurality of separate, substantially cam-like record elements on the supporting circle member. It will further be seen that it is because of this use of substantially cam-like record elements that a record can be produced on the film which allows rapid automatic scanning in lieu of the tedious reading of conventional number systems as hitherto practiced in this field.

A position record of the type shown at 127 can be scanned by photoelectric scanning systems which in this case basically act as counters rather than measuring devices; however the photoelectric devices scanning the lowermost row of circles in the subframe 127 will desirably have sufficient sensitivity to react to different degrees of partial exposure of a last circle, as suggested, and thus to measure positions with an accuracy of at least one-tenth of a decimal degree.

It may further be noted that many of the specific elements disclosed have only subsidiary importance for the present invention. Thus it is for instance possible to use a transparent drum instead of the transparent disc, with markings on the cylindrical surface of the drum. Likewise many further modifications of the subframe record are possible, for instance by record carriers of magnetic, electric or other types, as known in other fields of the cinematic art and somewhat related arts, as mentioned above. Finally the measured, transmitted values may also be automatically fed to computing devices either direct from the cinetheodolite or from the record produced thereby. In each case it is rather simple to insure properly coded and directed readings accurately reflecting great numbers of successive telescope and target positions.

We claim:

1. A cinetheodolite comprising: a telescope; a camera; a mechanism for angularly moving the telescope together with the camera to different, consecutive angular positions; means in the camera for producing on a photographic film record consecutive target images at predetermined ones of said positions of the telescope and camera, so that each image shows a target imaged through the telescope; a disc mounted for angular movement with the telescope and camera; a reference member opposite the disc; a marker system on the disc, including a plurality of separate, visible, spiral markers, disposed in different concentric portions of the disc, for identifying said consecutive angular positions by exposing a different series of points of spiral markers to the reference member in each consecutive angular position; and marker imaging means associated with the reference member, extending across the entire system of spiral markers and adapted in each of said predetermined positions to optically transmit to said film record a marker image indexed with the corresponding target image and showing one of said series of points, thereby facilitating automatic scanning of the film record.

2. Apparatus as described in claim 1 wherein the marker system on the disc additionally includes radial markings; the image means extending across the radial markings as well as across the system of spiral markers.

3. Apparatus as described in claim 2 wherein the radial markings are disposed in a concentric portion of the disc located outwardly of the system of spiral markers.

4. A cinetheodolite comprising: a telescope; a camera; a mechanism for angularly moving the telescope together with the camera to different, consecutive, angular positions; means in the camera for producing on a photographic film consecutive target images at predetermined ones of said positions of the telescope and camera, so that each image shows a target imaged through the telescope; a circle member and a reference member opposite the same, one such member being mounted for angular motion with the telescope and camera and the other such member being stationary in the cinetheodolite; a system of record elements comprising a plurality of separate, substantially cam-like record elements on the circle member for identifying said consecutive angular positions by exposing in each of them a distinctive series of at least portions of said cam-like record elements to the reference member; and means for deriving impulses from so exposed portions of said cam-like record elements and for transmitting such impulses to said film, the impulse deriving and transmitting means extending, on the reference member, across the entire system of cam-like record elements of the circle member, and being adapted in each of said predetermined positions to produce on said film a record element image, indexed with the corresponding target image and showing one of said distinctive series of at least portions of said cam-like record elements.

5. Apparatus as decribed in claim 4, wherein the system of record elements is of the opaque-transparent type, each record element being visible and the impulse deriving and transmitting means consisting of a system for effecting said transmitting by optically projecting record element images onto the film record.

6. Apparatus as described in claim 4, wherein the impulse deriving and transmitting means comprises means for separately and distinctively magnifying different portions of the record elements.

7. Apparatus as described in claim 4, wherein the impulse deriving and transmitting means comprises means for modifying the relative positions of different portions of the record elements while transmitting them.

References Cited in the file of this patent

UNITED STATES PATENTS

| | | |
|---|---|---|
| 1,033,866 | Blaine | July 30, 1912 |
| 2,111,516 | Roux | Mar. 15, 1938 |
| 2,116,086 | Van Berkel | May 3, 1938 |
| 2,211,847 | Bryce | Aug. 20, 1940 |
| 2,376,234 | De Castro | May 15, 1945 |
| 2,724,183 | Edison | Nov. 22, 1955 |

FOREIGN PATENTS

| | | |
|---|---|---|
| 698,800 | Great Britain | Oct. 21, 1953 |